(12) United States Patent
Mori et al.

(10) Patent No.: US 8,783,277 B2
(45) Date of Patent: Jul. 22, 2014

(54) ACTUATOR AND POSITION-DETECTING METHOD THEREFOR

(75) Inventors: Masakazu Mori, Koga (JP); Daisuke Kukita, Koga (JP); Chikara Kitajima, Koga (JP); Seiya Shimada, Koga (JP)

(73) Assignee: Seibu Electric & Machinery Co., Ltd., Fukuoka (JP)

( * ) Notice: Subject to any disclaimer, the term of this patent is extended or adjusted under 35 U.S.C. 154(b) by 297 days.

(21) Appl. No.: 13/500,242

(22) PCT Filed: Mar. 31, 2011

(86) PCT No.: PCT/JP2011/058170
§ 371 (c)(1),
(2), (4) Date: Apr. 4, 2012

(87) PCT Pub. No.: WO2011/125814
PCT Pub. Date: Oct. 13, 2011

(65) Prior Publication Data
US 2012/0199767 A1     Aug. 9, 2012

(30) Foreign Application Priority Data

Apr. 7, 2010  (JP) ................................. 2010-088693

(51) Int. Cl.
*F16K 31/05* (2006.01)
*F16K 31/53* (2006.01)
(52) U.S. Cl.
USPC ..... 137/1; 137/554; 251/129.03; 251/129.04; 251/129.11; 251/249.5; 324/207.25
(58) Field of Classification Search
USPC ................. 137/1, 554; 251/129.03, 129.04, 251/129.11–129.13, 249.5; 324/207.25
See application file for complete search history.

(56) References Cited

U.S. PATENT DOCUMENTS 4,789,132 A  *  12/1988  Fujita et al. .............. 251/129.11
4,809,742 A  *  3/1989  Grau ............................ 137/554
(Continued)

FOREIGN PATENT DOCUMENTS

| JP | 05-060182 | 3/1993 |
| JP | 05-231489 | 9/1993 |

(Continued)

OTHER PUBLICATIONS

International Search Report of International Application No. PCT/JP2011/058170 dated Jun. 28, 2011, and English Translation.

*Primary Examiner* — John Bastianelli
(74) *Attorney, Agent, or Firm* — Fay Sharpe LLP

(57) ABSTRACT

In an actuator, an electric power supply to a position-detecting detector for an object to be driven can be carried out in a timely manner during a power failure to thereby suppress an electric power consumption in the position-detecting detector, whereby duration time of a power-failure compensation battery can be prolonged, and a variety of detectors can be selected and utilized without limitation in accordance with a use environment and usefulness. During the power failure, a switching means 40 establishes a linking state in which an input shaft 11 of a reduction mechanism 10 and a manual inputting means 30 are linked to each other. When the linking state is detected by a detecting means, an electric power is fed from a battery 80 to a rotation detector by a control section 70, so that the control section 70 can obtain a displacement of the object to be driven, based on a signal output from the rotation detector. In a state in which the input shaft 11 of the reduction mechanism 10 can be manually rotated, the electric power is fed to the rotation detector. Thus, a useless consumption of the electric power of the battery 80 can be suppressed, and it is possible to suitably obtain the displacement of the object to be driven without an interruption even if the power failure happens.

23 Claims, 8 Drawing Sheets

(56) References Cited

U.S. PATENT DOCUMENTS

| | | | |
|---|---|---|---|
| 4,845,416 A * | 7/1989 | Scholl et al. | 251/129.04 |
| 6,283,150 B2 * | 9/2001 | Apel et al. | 137/554 |
| 6,450,255 B2 * | 9/2002 | Carmody et al. | 251/129.11 |
| 6,522,038 B2 * | 2/2003 | Byram | 324/207.25 |
| 6,896,407 B2 * | 5/2005 | Nomiyama et al. | 324/207.25 |
| 7,036,791 B2 * | 5/2006 | Wiese | 251/129.04 |
| 7,273,067 B2 * | 9/2007 | Quitmeyer et al. | 251/129.11 |
| 2007/0075285 A1 * | 4/2007 | Lovejoy | 251/129.03 |
| 2008/0087858 A1 * | 4/2008 | Hatsuzawa et al. | 251/129.11 |
| 2008/0121831 A1 * | 5/2008 | Ikeda | 251/129.11 |

FOREIGN PATENT DOCUMENTS

| | | |
|---|---|---|
| JP | 08-145126 | 6/1996 |
| JP | 10-047996 | 2/1998 |
| JP | 10-215593 | 8/1998 |
| JP | 2002-276838 | 9/2002 |
| JP | 2004-257419 | 9/2004 |
| JP | 2004-257420 | 9/2004 |
| JP | 2005-256936 | 9/2005 |
| JP | 2009-192022 | 8/2009 |

* cited by examiner (A) Current To Be Output To Interlock SW By Control Section (B) Real Current Output To Interlock SW (C) Timing At which Monitor Is Carried Out By Control Section (D) Determination Carried Out By Control Section (A) Usual Power Supply State 100μsec (B) Power Failure State 100μsec
5msec

ACTUATOR AND POSITION-DETECTING METHOD THEREFOR

TECHNICAL FIELD

The present invention relates to an actuator having an electric motor and used to open and close a valve or a gate which is provided in a fluid passage, and more particularly, to such an actuator to which a position-detecting method is applied so that a position detection can be carried out during a manual operation even when a power failure happens.

BACKGROUND ART

A valve or a gate is provided in a fluid passage through which a fluid such as a water flows, and is opened and closed to thereby regulate a flow of the fluid. In general, the valve or the gate is automatically opened and closed by an actuator in which an electric motor, a hydraulic motor or the like is used as a drive power source. In a case where this actuator is used, a ratio of opening of the valve or the gate can be ordinarily utilized as a piece of information for the opening and closing control thereof, and the actuator is provided with a detector (i.e., a sensor) such as an encoder or the like to thereby detect the ratio of opening of the valve or the gate, whereby it is possible to confirm the ratio of opening of the valve or the gate at a place at a place around the actuator or a monitoring station where is remote from the valve or the gate.

An example of a prior art actuator in which the ratio of opening of the valve and so forth can be caught by using the encoder or the like is disclosed in JP-2004-257419 A and JP-2004-257420 A.

CITATION LIST

Patent Literature

Patent Literature 1: JP-2004-257419 A
Patent Literature 2: JP-2004-257420 A

SUMMARY OF INVENTION

Technical Problem

In the prior art actuator, it is arranged so that the ratio of opening of the valve or the gate is grasped by using the encoder and so forth, as disclosed in the aforesaid Patent Literatures. The detector such as the encoder and so forth needs an electric power source, and the electric power from utility power is supplied to the detector, like supply to the electric motor which generates a driving force in the actuator.

On the other hand, in the valve or the gate, even though the electric motor cannot be used due to a utility power failure, an emergency situation, in which the valve or the gate must be immediately opened and closed, may occurs. For this reason, in many cases, the actuator is provided with a mechanism for manually operating the valve or the gate by an operator. During the utility power failure, since no electric power is supplied to not only the electric motor but also the detector such as the encoder and so forth, it is impossible to obtain the rate of opening of the valve or the gate from the detector. Therefore, a spare power source such as a battery and so forth is provided to thereby supply the detector with the electric power, whereby the ratio of opening of the valve or the gate can be obtained from the detector even when the valve or the gate is manually operated during the utility power failure.

In this case, as soon as the utility power failure happens, the encoder and so forth is switched to the battery. Nevertheless, in reality, since the connection between the battery and the encoder and so forth is maintained during the utility power failure even except for a case where the valve or the gate is manually operated by the operator, the electric power of the battery is wastefully consumed. Thus, a detector having a small electric power consumption must be used as the encoder and so forth, before a wasteful consumption of the battery can be suppressed as much as possible to thereby ensure a sufficient power supplying time in the battery. Accordingly, in the conventional actuator, there is a problem that it is difficult to use another detector having a large electric power consumption, but it's featuring superior accuracy, durability, flexibility to circumstances.

The present invention has been developed to solve the aforesaid problem, and aims at providing an actuator and a position-detecting method therefor in which an electric power supply to a position-detecting detector can be carried out in a timely manner during a utility power failure to thereby suppress an electric power consumption in the position-detecting detector, whereby duration time of a power-failure compensation battery can be prolonged, and a variety of detectors can be selected and utilized without limitation in accordance use environment and usefulness.

Solution to Problem

An actuator according to the present invention is to drive an object to be driven by transmitting a rotational driving force, generated in an electric motor, to the object to be driven, through the intermediary of a reduction mechanism, and includes: a manual inputting means that is rotated by a person's manual operation, and that is provided beside an input shaft defined as an input terminal of the reduction mechanism to which the rotational driving force is input; a switching means that switches a linking state in which the input shaft of the reduction mechanism is linked to the manual inputting means so as to be rotated and an unlinking state in which the input shaft of the reduction mechanism is not linked to the manual inputting means to each other; a detecting means that detects the linking state between the input shaft of the reduction mechanism and the manual inputting means; a rotation detector that detects a rotational state of an output shaft of the electric motor so as to output it as a signal; a control section that controls the electric motor, and that obtains a displacement of the object to be driven, based on a signal output from the rotation detector; and a battery that at least feeds an electric power to the control section in a power failure which is not a usual power supply state, wherein the input shaft of the reduction mechanism is directly connected to the output shaft of the electric motor to be integrally rotatable together therewith so that the rotational driving force generated in the electric motor is input to the input shaft of the reduction mechanism in the usual power supply state, and wherein the control section establishes a state in which the electric power is fed from the battery to only minimum necessary control circuits of the control in the power failure state, and a state in which the electric power is fed from the battery to the rotation detector so as to be able to obtain the displacement of the object to be driven, based on the signal output from the rotation detector.

As stated above, in accordance with the present invention, the manual inputting means for manually rotating the input shaft of the reduction mechanism by the person is provided with respect to the input shaft of the reduction mechanism which is rotationally driven in the usual power supply state, and the linking state, in which the input shaft of the reduction mechanism and the manual inputting means are linked to each other, is established by the switching means when the power failure happens. When the linking state is detected as the ON-state of the detecting means, the electric power is fed from the battery to the rotation detector by the control section. Thus, similar to the usual power supply state, even if the input shaft of the reduction mechanism and the output shaft of the electric motor are rotated by the person's operation through the intermediary of the manual inputting means during the power failure, the control section can obtain the displacement of the object to be driven, based on the signal output from the rotation detector. Thus, in a case where the object to be driven is operated by the manual operation during the power failure, the electric power is not fed to the rotation detector only when the power failure happens. That is, the electric power is not fed from the battery to the rotation detector until the input shaft of the reduction mechanism can be manually operated. Accordingly, a useless consumption of the electric power of the battery can be suppressed, and the displacement of the object to be driven can be suitably obtained, without interruption. Thus, even during the power failure, the displacement of the object to be driven can be preciously obtained in accordance with the movement thereof, and it is possible to continue the positional control of the object be driven without any problems when the power failure is solved. Also, due to the fact that the useless consumption of the electric power of the battery can be suppressed, a kind of sensor to be used as the rotation detector is not subjected to limitation, so that it is possible to select and utilize an optimum rotation detector in accordance with use conditions and use environment, whereby the displacement of the object to be driven can be preciously obtained, and it is possible to more suitably carry out the control of the object to be driven in the usual power supply state.

Also, the actuator according to the present invention may include a clutch body, if necessary. The clutch body is provided on the input shaft of the reduction mechanism so as to be axially slidable and be integrally rotatable together therewith, and includes a driven-side coupling portion provided at one end portion thereof in a sliding direction. The manual inputting means has a drive-side coupling portion which is rotatably provided beside the end portion of the clutch body so that a rotational axis of the drive-side coupling portion coincides with that of the input shaft of the reduction mechanism, and which is able to be coupled to the driven-side coupling portion of the clutch body. The switching means is provided so that at least a portion thereof is engaged with the clutch body such that an axial position of the clutch body is adjustable with respect to the input shaft of the reduction mechanism, with the clutch body being shifted by the switching means so that a connecting-state between the clutch body and the manual inputting means and a disconnecting-state therebetween are switched to each other, to thereby switch a linking state between the input shaft of the reduction mechanism and the manual inputting means and an unlinking state therebetween to each other. The detecting means comprises an interlock switch which is contacted with a portion of the switching means in accordance with a movement of the clutch body to establish the connecting-state between the clutch body and the manual inputting means by the switching means, to thereby turn ON the interlock switch.

As stated above, in accordance with the present invention, the clutch body which can be rotated together with the input shaft of the reduction mechanism, is axially shifted by the switching means, so that the connecting-state between the clutch body and the manual inputting means can be switched to the disconnecting-state therebetween, and vice versa. Thus, when the clutch body and the manual inputting means are connected to each other so that the input shaft of the reduction mechanism and the manual inputting means are linked to each other, the interlock switch is contacted with and turned ON by the switching means so that the electric power is fed from the battery to the rotation detector. Accordingly, when the power failure happens, the feeding of the electric power to the rotation detector is not carried out until the clutch body is shifted to the position corresponding to the connecting-state in the switching means and the clutch body are connected to each other by actually operating the switching means to thereby turn ON the interlock switch, and thus it is possible to surely prevent the consumption of the electric power of the battery in the situation in which the rotation detector is not operated, whereby the duration time of the battery can be prolonged. In addition, due to the simple mechanism in which the ON-state of the interlock switch can be obtained by the switching means, the linking-state between the input shaft of the reduction mechanism and the manual inputting means can be detected, and it is possible to surely carry out the detection. Further, the shift of the unlinking-state can be surely determined by the change of the interlock switch from the ON-state to the OFF-state, and it is possible to ensure high reliability in the detection of the linking-state.

Also, in the actuator according to the present invention, if necessary, the control section, to which the electric power is fed from the battery in the power failure state, may establish a current-outputting state in which an electric current intermittently flows into a circuit including the interlock switch at predetermined time intervals when the circuit is closed interlock switch, and may determine that the interlock switch is ON while the current-outputting state in which the electric current is intermittently flows is continued.

As stated above, in accordance with the present invention, the control is carried out by the control section so that electric current intermittently flows into the detecting means defined as the interlock switch. Thus, the ON-state of the detecting means, i.e., the state, in which the interlock switch is closed and the current intermittently flows therethrough, is intermittently monitored by the control section, and it is determined by the control section that the detecting means is ON while the state, in which the current intermittently flows through the interlock switch, is continued. Thus, the control is carried out by the control section so that the electric power may be fed from the battery to the rotation detector, and it is possible to shorten the total time of which the current actually flows through the detecting means. Accordingly, it is possible to suppress the power consumption in the circuit including the detecting means. As a result, a useless consumption of the electric power of the battery can be suppressed, so that a service life of the battery can be further prolonged.

Also, in the actuator according to the present invention, the rotation detector may comprise a resolver integrally provided on the electric motor, if necessary.

As stated above, in accordance with the present invention, the rotation detector is formed as the resolver, which is integrally attached to the electric motor so that a signal representing a rotating state of the output shaft of the electric motor is output from the resolver. Thus, although environmental conditions such as a temperature and so forth is changed, and although a disturbance such as a vibration and so forth is exerted on the resolver, the rotating state of the electric motor output shaft can be surely detected by the resolver having superior adaptability to the change of the environmental conditions and the disturbance, and it is possible to obtain the displacement of the object to be driven from the control section with high precision under any circumstances.

Also, in the actuator according to the present invention, if necessary, the control section may establish a state in which an electrical current intermittently flows into the resolver at least plural times at time intervals whenever the electric motor output shaft makes one revolution, upon detecting the linking state between the input shaft of the reduction mechanism and the manual inputting means by the detecting means so that the electric power is fed from the battery to the resolver.

As stated above, in accordance with the present invention, in the state in which the electric power is fed from the battery to the resolver, the control is carried out by the control section so that the current intermittently flows into the resolver defined as the rotation detector at the time intervals. Thus, a signal representing angular position of the output shaft of the electric motor is output from the resolver plural times whenever the output shaft of the electric motor makes one revolution, and so that it is possible to count a number of revolutions of the output shaft based on the signals. Accordingly, while maintaining the state in which the displacement of the object to be driven can be suitably obtained based on the signals output from the resolver, it is possible to shorten the total time of which the current actually flows through the resolver, so that the power consumption in a circuit including the resolver can be reduced. As a result, a useless consumption of the electric power of the battery can be suppressed, so that the duration time of the battery can be further prolonged.

Also, in the actuator according to the present invention, if necessary, the reduction mechanism may comprise a worm gear reduction mechanism, a worm of which is integrally mounted on the input shaft of the reduction mechanism, and a control is carried out by the control section so that an angular velocity of the output shaft of the electric motor is increased and decreased within a predetermined range with respect to a target velocity, which is set based on a velocity command concerning an operation of the object to be driven, in the usual power supply state, and so that the increasing and decreasing fluctuation is repeated.

As stated above, in accordance with the present invention, the reduction mechanism is formed as the worm gear mechanism. Thus, while the worm which is integrated with the input shaft is rotated by the electric motor, a control is carried out by the control section so that the angular velocity of the electric motor output shaft is increased and decreased within the predetermined range with respect to the target velocity, and so that the increasing and decreasing fluctuation is repeated. Thus, the fine fluctuation is exerted on the angular velocity of the worm so that the worm is rotated in the state which may be regarded as the fine oscillation in the rotational direction thereof. As a result, due to the generation of the fine general-oscillation, the contact state between the gear faces of the worm and the gear faces of the worm wheel is improved so that friction in the slide contact therebetween is decreased, to thereby result in progress in the force transmission efficiency of the worm gear mechanism. Thus, it is possible to further increase the driving force and the torque which are transmitted to the object to be driven by the actuator. Accordingly, if the electric motor and the reduction mechanism are miniaturized, it is possible to use them in a situation in which a large-sized actuator having a high rated performance is needed, because the real driving force and the torque can be increased. Further, it is possible to miniaturize the whole of the actuator without deterioration of the performance.

Also, in a position-detecting method for an actuator according to the present invention, a rotational driving force, generated in an electric motor, is transmitted to an object to be driven, through the intermediary of a reduction mechanism. The position-detecting method comprises: feeding an electric power from a battery to minimum necessary circuits of a control section during a power failure; further feeding an electric power from the battery to a resolver for detecting a rotating state of an output shaft of the electric motor during the power failure, when the control section detects an ON-state of an interlock switch which represents that an input shaft of the reduction mechanism is linked to a manual inputting means rotationally driven by a person's driving operation, so as to be rotated; and obtaining a displacement of the object to be driven based on a signal which is output from the resolver, and which is related to the rotating state of the output shaft of the electric motor resulting from the person's driving operation.

As stated above, in accordance with the present invention, when the power failure happens, the linking-state, in which the manual inputting means rotationally driven by a person's driving operation and the input shaft of the reduction mechanism are linked to each other, is established to thereby cause the ON-state of the interlock switch. When this ON-state of the interlock switch is detected by the control section, the electric power is fed from the battery to the resolver by the control section. Thus, similar to the usual power supply state, even if the input shaft of the reduction mechanism and the output shaft of the electric motor are rotated by the person's operation through the intermediary of the manual inputting means during the power failure, the control section can obtain the displacement of the object to be driven, based on the signal output from the resolver. Thus, in a case where the object to be driven is operated by the manual operation during the power failure, the electric power is not fed to the resolver only when the power failure happens. That is, the electric power is not fed from the battery to the resolver until the input shaft of the reduction mechanism can be manually operated. Accordingly, a useless consumption of the electric power of the battery can be suppressed, and the displacement of the object to be driven can be suitably obtained, without interruption. Thus, even during the power failure, the displacement of the object to be driven can be preciously obtained in accordance with the movement thereof, and it is possible to continue the positional control of the object be driven without any problems when the power failure is solved. Also, due to the fact that the useless consumption of the electric power of the battery can be suppressed, it is possible to utilize the resolver featuring a larger power consumption than that of an encoder and so forth without any problems, whereby the displacement of the object to be driven can be preciously obtained by using the resolver, and it is possible to suitably carry out the control of the object to be driven in the usual power supply state.

DESCRIPTION OF EMBODIMENTS

First Embodiment of the Invention

Figure 1:
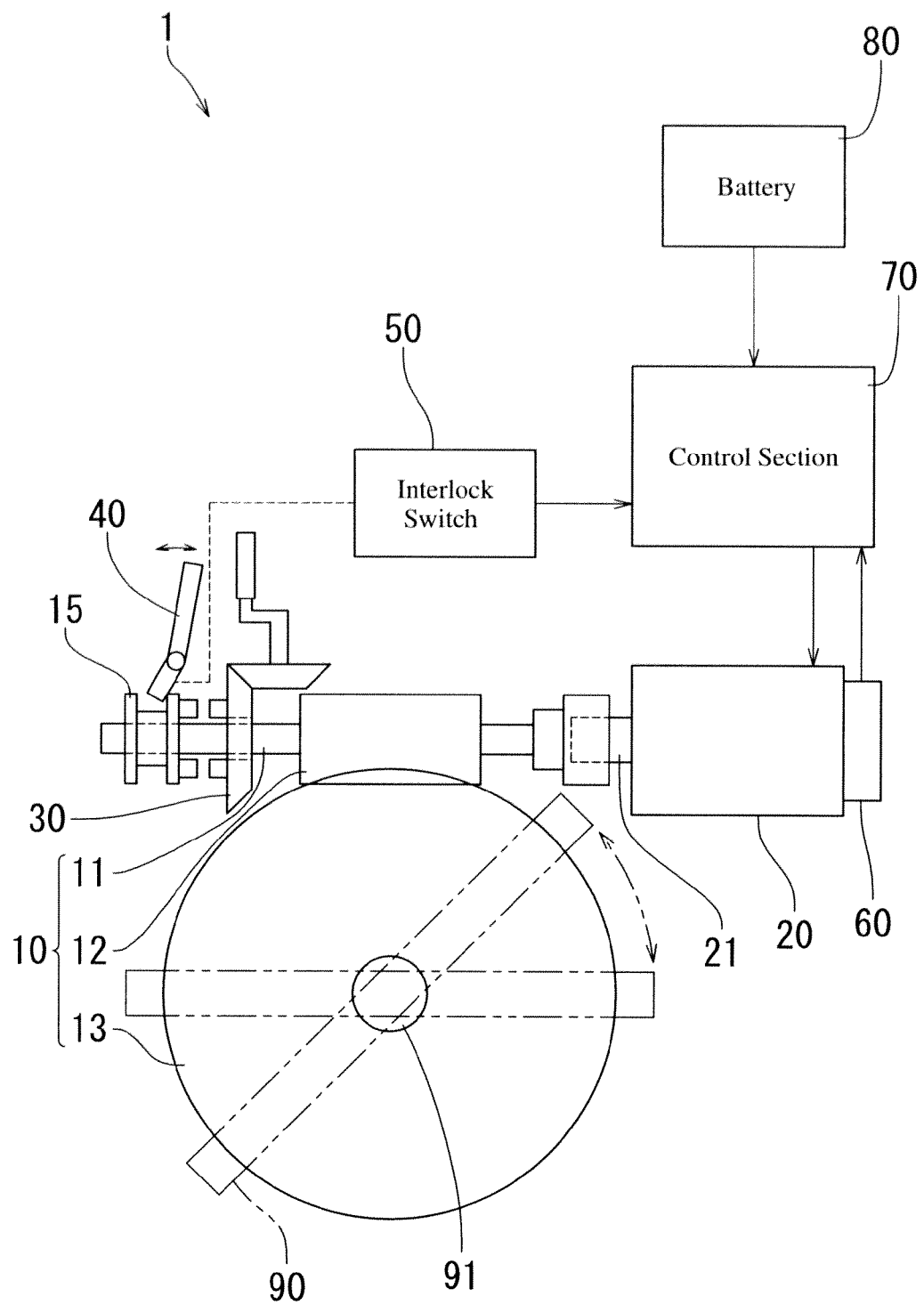
FIG. 1 is a schematic view for explaining an actuator according to a first embodiment of the present invention.
Figure 2:
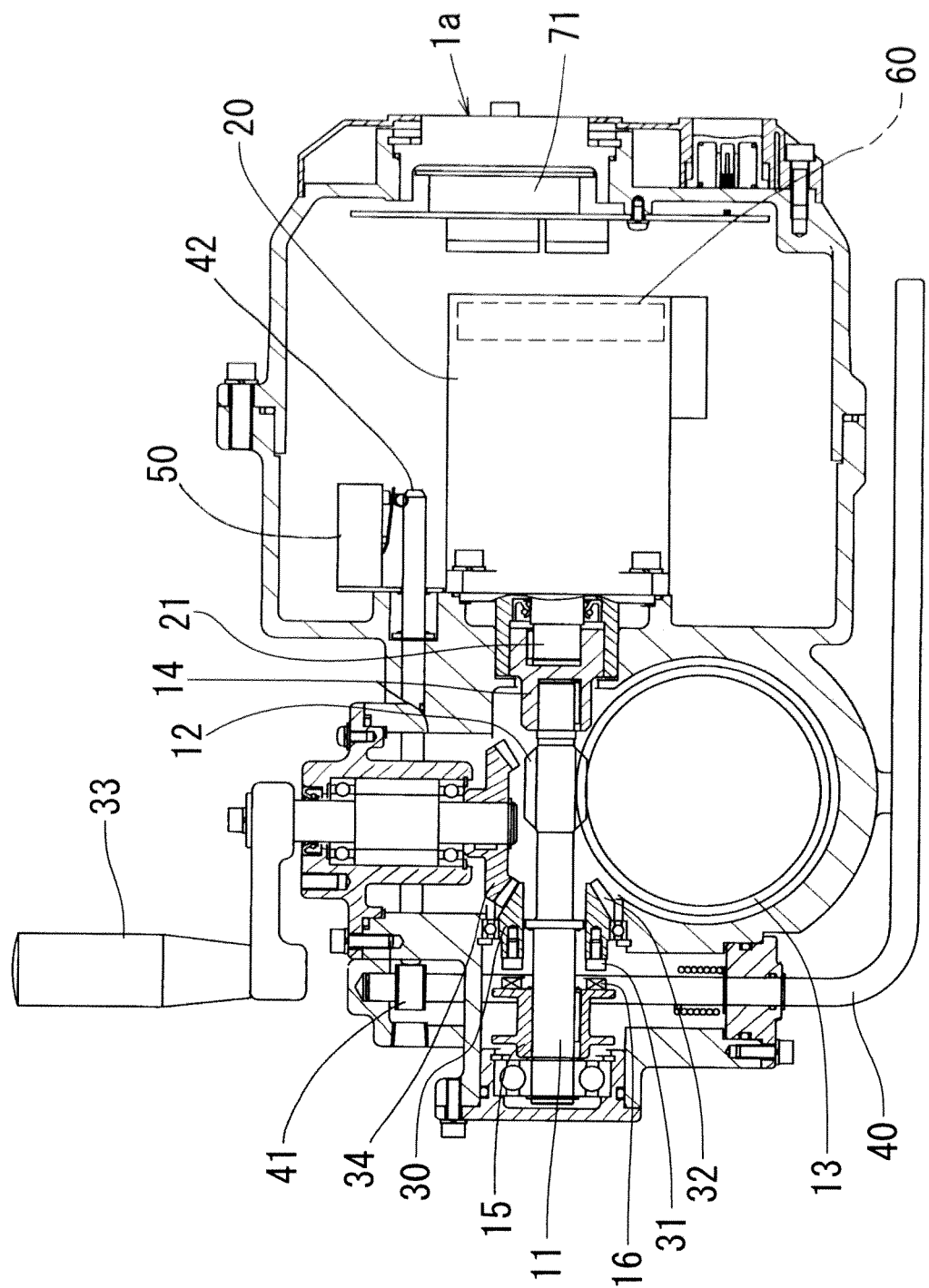
FIG. 2 is a schematic laterally cross-sectional view for explaining the actuator according to the first embodiment of the present invention.
Figure 3:
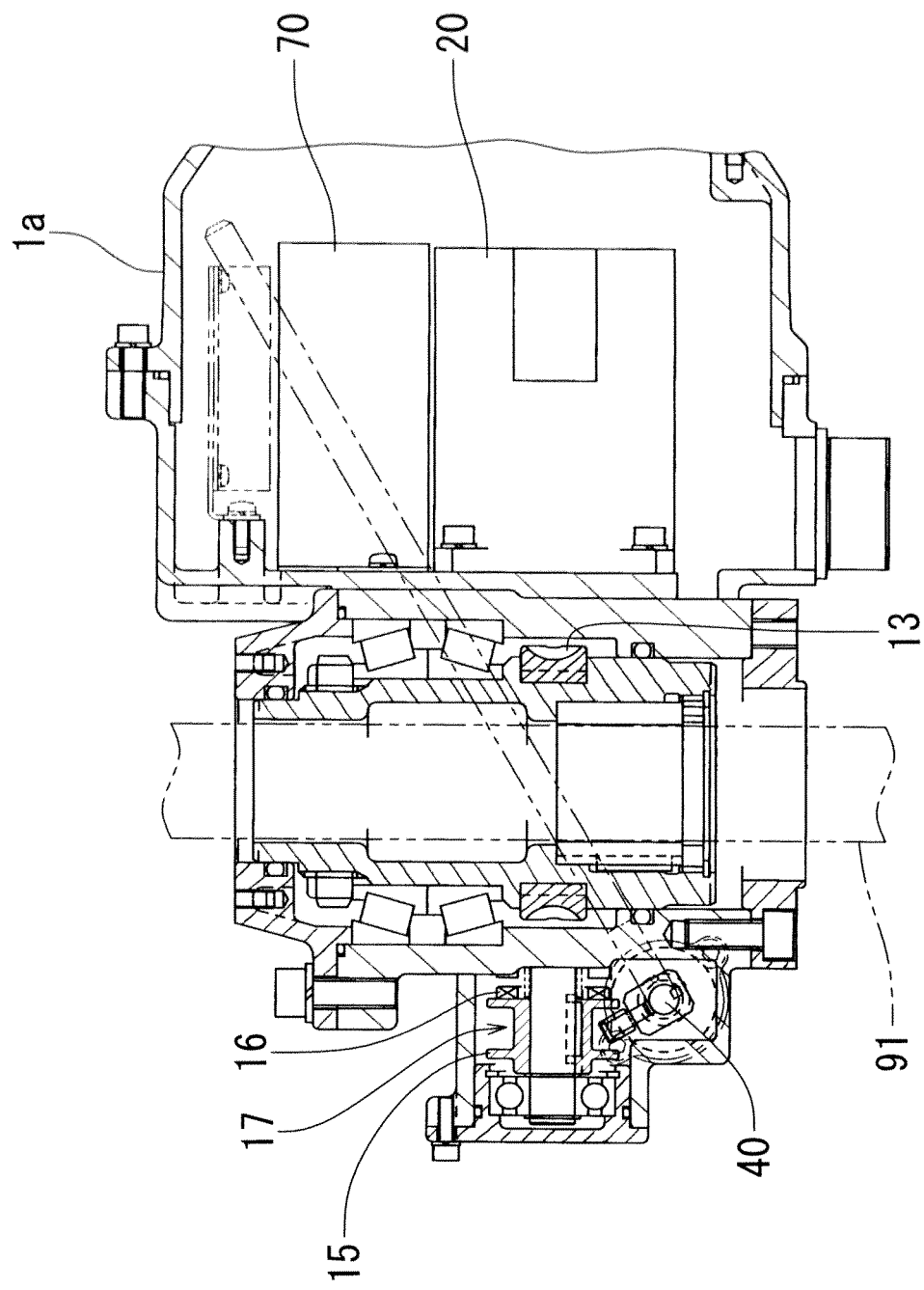
FIG. 3 is a schematic longitudinal cross-sectional view for explaining the actuator according to the first embodiment of the present invention.
Figure 4:
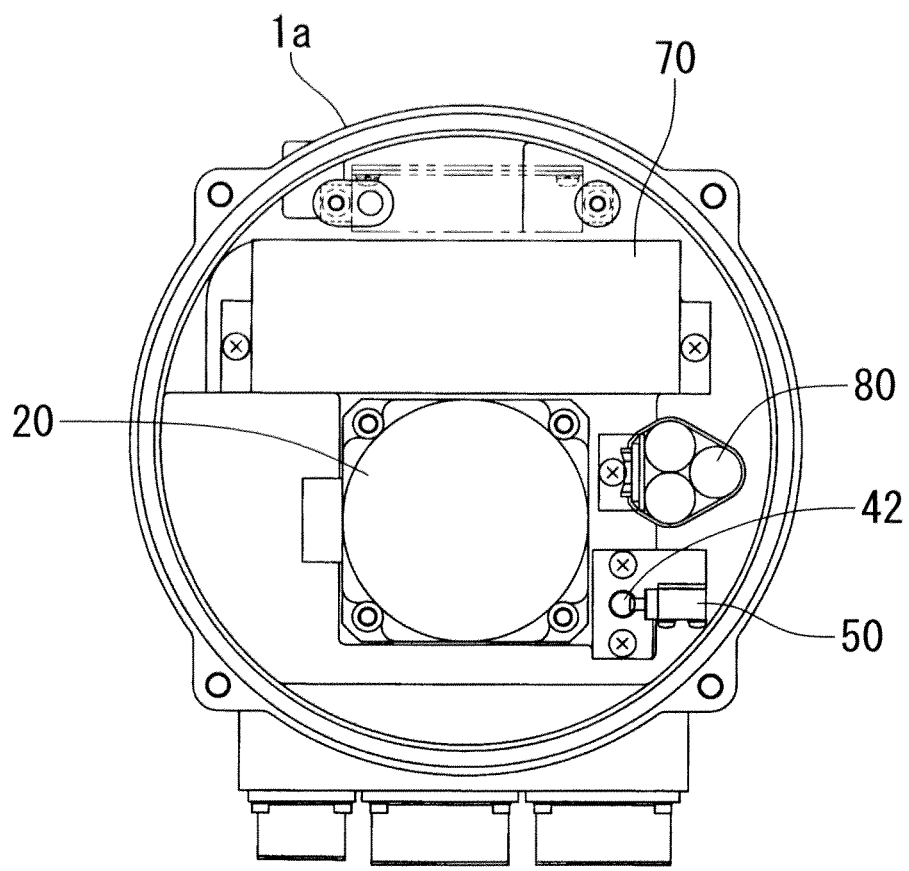
FIG. 4 is a cut-away end view of an actuator casing of the actuator according to the first embodiment of the present invention.

With reference to FIGS. 1 to 4, an actuator according to a first embodiment of the present invention will now be explained below.

In these drawings, the actuator 1 according to the first embodiment of the present invention includes: a reduction mechanism 10 for transmitting a valve driving force to a support shaft 91 by which a valve 90 defined as an object to be driven is integrally and rotatably supported; an electric motor 20 connected to the reduction mechanism 10 so that the valve driving force is given to the valve 90 through the intermediary of the reduction mechanism 10; a manual inputting means 30 which is provided besides an input shaft 11 defined as an input terminal of the reduction mechanism 10, and which is rotated by a person's driving operation; a switching means 40 for switching a state in which the input shaft 11 of the reduction mechanism 10 is linked to the manual inputting means 30 so as to be rotated and a state in which the input shaft 11 of the reduction mechanism 10 is not linked to the manual inputting means 30 to each other; an interlock switch 50 defined as a detecting means for detecting the linking state between the input shaft 11 of the reduction mechanism 11 and the manual inputting means 30; a resolver 60 defined as a rotation detector for detecting a rotating state of the output shaft 21 of the electric motor 20; a control section 70 for controlling the electric motor 20, and for acquiring a displacement of the valve 90, i.e., a ratio of valve opening thereof based on a signal output from the resolver 60; and a battery 80 for supplying an electric power to the control section 70 and so forth as an electric power source during a power failure in which a usual power supply cannot be obtained.

The input shaft 11 of the aforesaid reduction mechanism 10 is integrally connected to the output shaft 21 of the electric motor 20 through the intermediary of a joint portion 14 so as to be rotated, and the reduction mechanism 10 also includes a worm 12 integrated with the input shaft 11, and a worm wheel 13 engaged with the worm 12 and mounted on the support shaft 91 of the valve 90 so as to be integrally rotatable together with the support shaft 91. The reduction mechanism itself is a known mechanism provided in an actuator casing 1a, in which a rotational driving force got from the electric motor 20 is reduced speed while transmitted from the worm 12 to the worm wheel 13 so that the rotational driving force is brought to the support shaft 91 so as to rotate the support shaft 91 together with the valve 90 by a given angle, thereby opening and closing the valve. Thus, a further detailed explanation on the reduction mechanism is omitted.

Also, a clutch body 15 is mounted on the input shaft 11 of the reduction mechanism 10, and can be linked to the manual inputting means 30 so as to make the input shaft 11 to be rotatable. The clutch body 15 mounted on the input shaft 11 is axially slidable, but it is rotatable together with the input shaft 11. A driven-side coupling portion 16 having a plurality of teeth is provided on an end portion of the clutch body 16 in the sliding direction.

In the reduction mechanism 10, the valve 90 is opened and closed by rotating the worm wheel 13 mounted on the support shaft 91 joined to the valve 90. Similarly, although, in a reduction mechanism for a butterfly valve or the like, a valve 90 is opened and closed by rotating it, the present invention is not limited to only this reduction mechanism. As long as a valve is opened and closed by utilizing a rotational forcing force of an electric motor, it is possible to use another reduction mechanism in which a valve is opened and closed by driving it upward and downward in a similar manner to a globe valve, a gate valve and so forth. For example, as a reduction mechanism for a gate valve or the like, a support shaft may have a male thread portion which is threadedly engaged with a female thread portion joined to a worm wheel, and the worm wheel is rotationally driven by the electric motor through the worm gear reduction mechanism, so that the support shaft is linearly driven so as to open and lose a valve.

The electric motor 20 comprises a servo-motor, the output shaft 21 of which is directly joined to the worm 12 of the reduction mechanism 10, and the servo-motor is provided in the actuator casing 1a, and is electrically connected to the control section 70 so as to be rotated under control of the control section. The rotational driving force generated by the electric motor 20 is reduced speed by the reduction mechanism 10, and is then transmitted to the support shaft 91 of the valve 90 defined as the object to be driven, so that the valve 70 is rotated by a given rotational angle.

Since the aforesaid electric motor 20 is formed as the servo-motor, it is possible to realize a desirable number of revolutions (i.e., an angular velocity) by only the electric motor 20. In an actuator of conventional type having an equivalent driving force, a reduction gear mechanism is provided between an electric motor and a worm shaft. However, in this embodiment, since the worm can be rotated at a suitable number of revolutions by the electric motor, it is unnecessary to provide such a reduction gear mechanism between the electric motor and the worm shaft, so that the whole of the actuator can be correspondingly made small and it is possible to suppress noises due to no engagement between gears of the reduction gear mechanism.

The aforesaid manual inputting means 30 includes a drive-side coupling portion 31 which is rotatably provided beside the aforesaid end portion of the clutch body 16 so that a rotational axis of the drive-side coupling portion 31 coincides with that of the input shaft 11 of the reduction mechanism 10, and which can be engaged with and coupled to the driven-side coupling portion 16 of the clutch body 15, and a gear portion 32 provided on an opposite side of the drive-side coupling portion 31, and a rotational driving force driving from a person's manual operation is transmitted to the drive-side coupling portion through a manual handle 33 and a manual gear 34.

The aforesaid switching means 40 includes a lever-shaped body, a portion of which is arranged within an interior of the actuator casing 1a, and a part of the portion of the lever-shaped body arranged within the actuator casing 1a is engaged with a groove portion 17 of the clutch body 15 so that an axial position of the clutch body 15 is adjustable with respect to the input shaft 11. The portion of the switching means 40 exposed out of the actuator casing 1a is switchable by a person's operation to either a predetermined automatic position and a predetermined manual position, and the clutch body 15 is shifted by an inclining movement of the switching means 40 concerning the automatic position and the manual position, so that a connecting-state between the clutch body 15 and the manual inputting means 30 is switched to a disconnecting-state therebetween, and vice versa, i.e., so that a linking state between the input shaft 11 of the reduction mechanism and the manual inputting means 30 is switched to an unlinking state therebetween, and vice versa. In order that the aforesaid interlock switch 50 is switched on and off in accordance with the movement of the lever-shaped body of the switching means 40, the switching means 40 includes a protruded cam portion 41 provided in the actuator casing 1a, and a rod portion 42 which is abutted against the cam portion 41 with a spring-biasing force, and which is moved forward and rearward in accordance with an angular position of the cam portion 41.

The aforesaid interlock switch 50 can be contacted with the rod portion 42 of the switching means 40, which is moved in accordance with the movement of the switching means 40 which is carried out until the clutch body 15 is connected to the manual inputting means 30, to thereby cause the ON-state of the interlock switch in the aforesaid connecting-state. The interlock switch itself is a usual contact switch which is turned ON when it is contacted with the end of the rod portion 42, and which is turned OFF when it is moved away from the end the rod portion 42, and thus a further detailed explanation on the interlock switch is omitted.

During the operation of the manual handle, the interlock switch prevents a rotational operation of the electric motor during the manual operation of the handle by maintaining a state in which the supply of electric power to the electric motor is cut off, using a physical switch mechanism which is operated when the switching means is switched to a manual operation side. Nevertheless, if the physical switch mechanism is damaged, and if the power failure state is returned to the usual power supply state, the electric motor may be accidentally supplied with the electric power during the manual operation of the handle so that an accident in which an operator falls into a dangerous situation may happen. For this reason, it is preferable to provide a dual interlock system, including the aforesaid interlock switch, in which the supply of electric power to the electric motor is cut off while the electric motor output shaft is rotated due to not the electric power supply but the rotation of the worm caused by the operation of the manual handle. For example, due to the fact that the manual handle and the electric motor output shaft are linked with each other, the electric motor output shaft is rotated by the rotation of the manual handle, and thus the electric motor generates an electric power as an electrical generator so that the generated electric power is input to the drive control section. While the input electric power is detected by the drive control section, it recognizes that the actuator is in the manual operation state, and the control is carried out that no electric power is supplied to the electric motor so as to prevent the electric motor from being driven during the manual operation of the handle, to thereby ensure safety.

In a case where the actuator is provided with the manual handle 33 which is always linked to the manual inputting means 30 as shown in this embodiment, it is preferable that a timing at which the interlock switch 40 is contacted with the part of the switching means 40 while switching from the automatic position to the manual position to thereby establish the ON-state of the interlock switch is prior to a timing at which the connecting-state in the driven-side coupling portion 16 is engaged with the drive-side coupling portion 31 is established. According to this arrangement, even if the switching means 40 is switched from the automatic position to the manual position while the electric motor 20 is not stopped, the connecting state between the clutch body 15 and the manual inputting means 30 can be established after the interlock switch 50 is tuned ON, so that it is possible to prevent a dangerous rotation of the manual handle 33 which may be caused by the connection between the clutch body 15 and the manual inputting means 30 while the electric motor 20 is not stopped, to thereby ensure safety. Also, when the switching means 40 is reversely switched from the manual position to the automatic position, since the interlock switch 50 is turned OFF after the disconnecting-state is established between the clutch body 15 and the manual inputting means 30, at the time when the switching means 40 is switched from the manual position to the automatic position, it is possible to rotate the electric motor 20 after the disconnecting-state is established between the clutch body 15 and the manual inputting means 30 even if the power failure state is already returned to the usual power supply state. Thus, although the rotation of the electric motor 20 is initiated by the electric power supply, it is possible to prevent the transmission of the rotation from the electric motor to the manual handle 33, to thereby ensure safety.

The aforesaid resolver 60 is integrally attached to an end of the electric motor 20, and converts a rotational displacement of the electric motor output shaft 21 into an electrical signal, with the resolver being formed as a known sensor which outputs such an electrical signal. The resolver 60 is connected to the control section 70 so that the electric signal can be output thereto, and is used for a servo-control of the electric motor 20 by the control section 70. Further, in the control section 70, a ratio of valve opening of the valve is calculated based on output signals of the resolver 60 to thereby grasp the ratio of valve opening. Note that a rotation detector, which is originally and integrally installed in the electric motor 20 as a part thereof, may be used as the resolver 60.

Since the resolver 60 is adopted as the rotation detector to thereby output a signal representing a rotating state of the output shaft 21 of the electric motor 20, although environmental conditions such as a temperature and so forth is changed, and although a disturbance such as a vibration and so forth is exerted on the resolver, not only can the rotating state of the electric motor output shaft 21 be surely detected by the resolver 60 having superior adaptability to the change of the environmental conditions and the disturbance, but also it is possible to obtain the ratio of valve opening of the valve 90 from the control section 70 with high precision under any circumstances.

The aforesaid control section 70 carries out a servo-control of the electric motor 20 based on an output signal output from the resolver 60 and an operational command, representing that the valve 90 is opened at a given ratio of valve opening, which is input from an external operation/command control means and so forth to the control section. Further, the control section 70 acquires a displacement of the valve 90, i.e., a ration of valve opening based on a signal output from the resolver 60, and carries out a control to regulate an electric power supply from the battery 80 during a power failure.

In a control of during the power failure, the control section 70 establishes a state in which the battery 80 feeds an electric power to only minimum necessary control circuits. Further, when the control section 70 detects the ON-state of the interlock switch 50, i.e., the linking state between the input shaft 11 of the reduction mechanism 10 and the manual inputting means 30, it carries out a control in which the electric power is fed from the battery to the resolver 60, so that the control section 70 can obtain a ratio of valve opening of the valve 90 based on the output signal from the resolver 60 when the valve 90 is operated by a person's manual operation even during the power failure.

In conjunction with the control section 70, a displaying portion 71 may be provided at a visible location of the actuator casing 1a so that the valve 90 can be manually opened and closed while confirming the ratio of valve opening beside the actuator 1. In this case, of course, a control is carried out by the control section 70 so that the electric power is also fed from the battery 80 to the displaying portion 71, whereby the ratio of valve opening can be displayed thereon.

In addition, the control section 70 may have an inputting and outputting means for a general-purpose memory medium such as a memory card and so forth, through which setting data, historical information data such as a number of operation times and so forth stored in the interior thereof are transferred to an external piece of equipment for management and analysis, whereby it is possible to easily gain and effectively utilize the data accumulated by the running of the actuator.

Note, in the operation of the electric motor 20 carried out by the control section 70, since a basic sequential control, in which the electric motor 20 is stopped after the valve 70 is opened and closed to move it to a predetermined ratio of valve opening, is a servo-control concerning a known valve opening and closing regulation, a further detailed explanation is omitted.

Also, in the control section 70, a control is carried out so that the electric power source of the control section 70 may be changed from a utility power to the battery 80 when the power failure happens, and a control is carried out so that the electric power source of the control section 70 may be returned from the battery 80 to the utility power when the power failure is solved, but these control are known as a general power failure compensating control. Thus, a further detailed explanation is omitted.

The aforesaid battery 80 may be either a primary battery or a secondary battery which has a capacity so that an electric power can be sufficiently fed to the control section 70, the resolver 60 and so forth as the electric source during the power failure, and is installed together with the interlock switch 50 and the control section 70 in the interior of the actuator casing 1a beside the electric motor 20. Like this, since all the electrical parts, i.e., the electric motor 20, the interlock switch 50, the resolver 60, the control section 70 and the battery 80 are accommodated together in a common space defined within the actuator casing 1a, it is possible to wire these electrical parts in minimum necessary wire lengths without threading long wires. Thus, not only can a cost be reduced but also it is possible to easily carry out maintenance. Also, the electrical parts are externally isolated by the actuator casing 1a, the electrical parts are hard to be subjected to an influence of an environmental change such as temperature, moisture and so forth, resulting in improvement in durability.

Similar to an ordinary valve actuator, the actuator according to this embodiment may be constituted so that variety of pieces of information such as pieces of valve-positional information (e.g., a valve fully-opened position and a valve fully-closed position), pieces of alarm information (e.g., a torque alarm and a thermal alarm) and so forth are output to an external piece of equipment by using a relay output, and it is desirable that the outputting of these pieces of information is continued during not only the usual power supply state but also the power failure state. A relay used to output the variety of the pieces of information on the actuator should be preferably a latch type relay in which a contact state can be maintained even if the power supply is turned OFF, and thus it is possible to hold the relay output during the power failure so that an exact information transmission to the external piece of equipment can be carried out, similar to the fact that the detection of the rotation state by the resolver is possible during the power failure.

Next, based on the aforesaid arrangement, reference is made to the usual power supply state and the power failure state in the actuator. It is assumed that the battery 80 has a remaining capacity so that the electric power can be sufficiently fed to the control section 70, the resolver 60 and so forth during the power failure.

In the usual power supply state in which the electric power is fed from the utility power, when a command signal representing either an opening operation or a closing operation on the valve 90 is externally input to the control section 70, the electric motor 20 is initially driven by the control section 70 so that a rotation of the output shaft 21 is started. Thus, the electric motor 20 transmits a rotational driving force to the support shaft 91 of the valve 90 through the intermediary of the reduction mechanism 10 so that the valve 90 is opened and closed.

When the output shaft 21 of the electric motor 20 is rotated, the control section 70 carries out a servo-control based on a signal output from the resolver 60, and also obtains a ratio of valve opening of the valve 90. The ratio of valve opening is displayed on the display portion 71, and is output to the external operation/command control means and so forth. Similar to an ordinary valve opening and closing control, when the valve 90 is moved to a position corresponding to a predetermined ratio of valve opening, the electric motor 20 is stopped, resulting in completion of the valve opening and closing operation.

When the power failure happens for any reason, so that the electric motor 20 cannot be driven due to the fact that the electric power is not fed from the utility power, to the electric motor, the control section 70 establishes a state in which the electric power is fed from the battery 80 to only the minimum necessary control circuits for the motor control portion of the control section 70, the display portion 71. In this power failure state, when no operation is carried out to the actuator, the electric power is not fed from the battery 80 to the resolver 60, so that a power consumption of the battery 80 is very small.

In the situation in which the electric motor 20 is not used due to the power failure, when it is necessary to open and close the valve 70, in order that the valve 90 can be manually operated by an operator, the switching means 40 is moved from the ordinary automatic position toward the manual position, and thus the portion of the switching means 40, which is arranged within the interior of the actuator casing 1a, is moved so that the clutch body 15 is slidably moved along the input shaft 11 is shifted toward the manual inputting means 30. Thus, the driven-side coupling portion 16 of the clutch body 15 is engaged with the drive-side coupling portion 31 of the manual inputting means 30 so that the clutch body 15 is connected to the manual inputting means 30. As a result, the reduction mechanism input shaft 11 and the manual inputting means 30 are linked to each other so that the rotational driving force obtained by operating the manual handle 33 by the operator is input to the input shaft 11 of the reduction mechanism 10 through the intermediary of the manual gear 34 and the manual inputting means 30, resulting in establishment of a manual opening and closing state in which the valve 90 can be manually opened and closed.

On the other hand, the cam portion 41 of the manual inputting means 40, which is provided in the actuator casing 1a, is also moved so that the rod portion 42, which is abutted against the cam portion 41, is shifted so as to be contacted with interlock switch 50, resulting in establishment of the ON-state of the interlock switch 50. As soon as the interlock switch 50 establishes the ON-state, an electric current flows through the interlock switch 50 so that the control section 70 detects the ON-state of the interlock switch 50, a control is immediately carried out by the control section 70 so that the electric power is fed from the battery 80 to the resolver 60.

Thus, since the resolver 60 is supplied with the electric power even during the power failure, a signal can be output from the resolver 60 so that the control section 70 can obtain the ratio of valve opening of the valve 90 based on the signal. In reality, when the manual handle 33 is operated by the operator, the input shaft 11 of the reduction mechanism 10 is rotated so that not only the valve 90 is operated by the driving force transmitted through the reduction mechanism 10, but also the electric motor output shaft 21, which is integrated with the input shaft 11, is rotated to thereby output a signal from the resolver 60, whereby the control section 70 can calculate and obtain the ratio of valve opening of the valve 90.

After the manual opening and closing operation of the valve 90 by the manual handle 33 is completed, the switching means 40 is returned from the manual position to the ordinary automatic position, and thus the clutch body 15 and the manual inputting means 30 are again disconnected from each other so that the reduction mechanism input shaft 11 and the manual inputting means 30 are returned to the unlinking state in which they are not linked to each other. On the other hand, the interlock switch 50 is also returned to the OFF-state so that the control section 70 again establishes the state in which the electric power is not fed from the battery 80 to the resolver 60, to thereby suppress the power consumption of the battery 80. Then, when the power failure is solved, the control section 70 changes the electric power source of the control section 70 from the battery 80 to the utility power, and the electric power is fed from the utility power to the resolver 60, resulting in a return to the usual power supply state.

As stated above, the actuator according to this embodiment is provided with the manual inputting means 30 for manually rotating the input shaft 11 of the reduction mechanism 10 by the person, and the linking state, in which the input shaft 11 of the reduction mechanism 10 and the manual inputting means 30 are linked to each other, is established by the switching means 40 when the power failure happens. When the linking state is detected as the ON-state of the interlock switch 50, the electric power is fed from the battery 80 to the resolver 60 by the control section 70. Thus, similar to the usual power supply state, even if the input shaft 11 of the reduction mechanism 10 and the output shaft 21 of the electric motor 20 are rotated by the person's operation through the intermediary of the manual inputting means 30 during the power failure, the control section 70 can obtain the ratio of valve opening of the valve 90 based on the signal output from the resolver 60. Thus, in a case where the valve 90 is operated by the manual operation during the power failure, the electric power is not fed to the resolver 60 only when the power failure happens. That is, the electric power is not fed from the battery 80 to the resolver 60 until the input shaft 11 of the reduction mechanism 10 can be manually operated. Accordingly, a useless consumption of the electric power of the battery 80 can be suppressed, and it is possible to suitably obtain the ratio of valve opening of the valve 90, without interruption. Thus, even during the power failure, the ratio of valve opening of the valve 90 can be preciously obtained in accordance with the movement of the valve 90, and it is possible to continue the positional control of the valve 90 without problems when the power failure is solved.

Second Embodiment of the Invention

In the actuator according to the aforesaid first embodiment, although the electric current flows through the interlock switch 50 without a specific regulation to detect the ON-state of the interlock switch 50 by the control section 70 during the power failure, the present invention is not limited to this. According to the second embodiment, the control section 70 is arranged so as to establish an electric current outputting state in which an electric current intermittently flows through a circuit including the interlock switch 50 at predetermined regular intervals when the circuit is closed.

The control section 70 monitors the electric current flowing through the circuit including the interlock switch 50. The circuit including the interlock switch 50 turns into a closed circuit when the interlock switch 50 is closed. The control section 70 determines the interlock switch 50 is ON, when the electric current flows through the interlock switch 50. While the manual opening and closing operation of the valve 90 is carried out by the operator, the interlock switch 50 continuously maintains the ON-state, so that the electric current can continuously flow through the circuit. If the electric current only continues flowing through the circuit, the electric power of the battery will be unnecessarily consumed.

Figure 5:
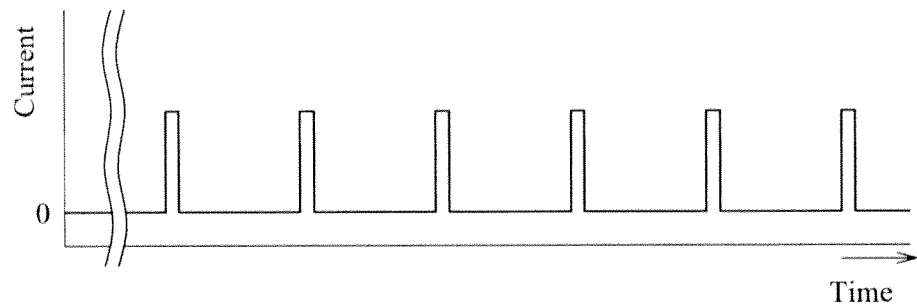
FIG. 5 is an explanatory view showing a current-flowing state of an interlock switch of an actuator according to a second embodiment of the present invention.
Figure 5:
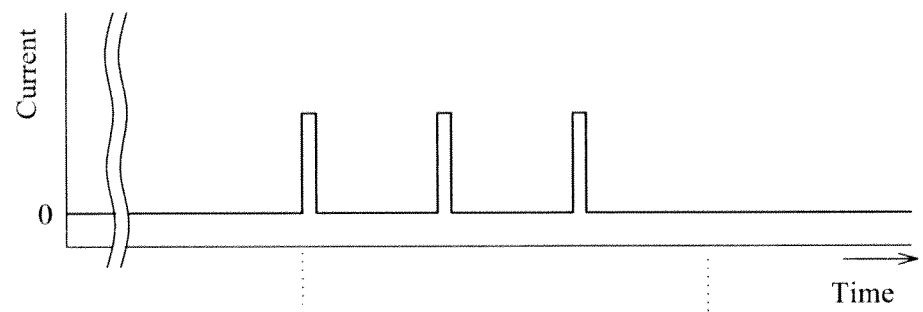
Figure 5:
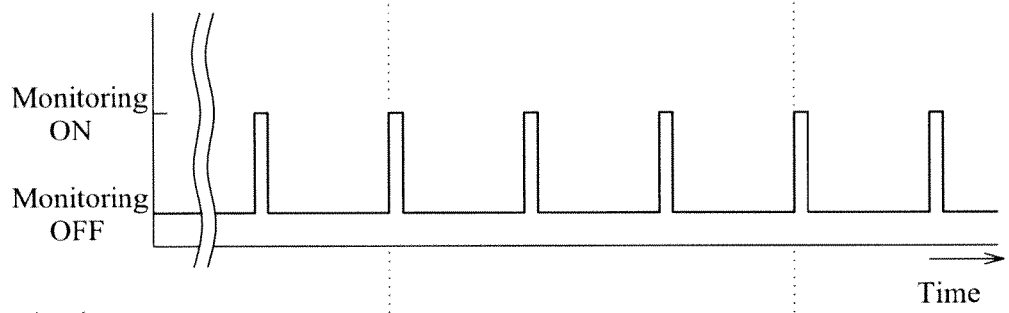
Figure 5:
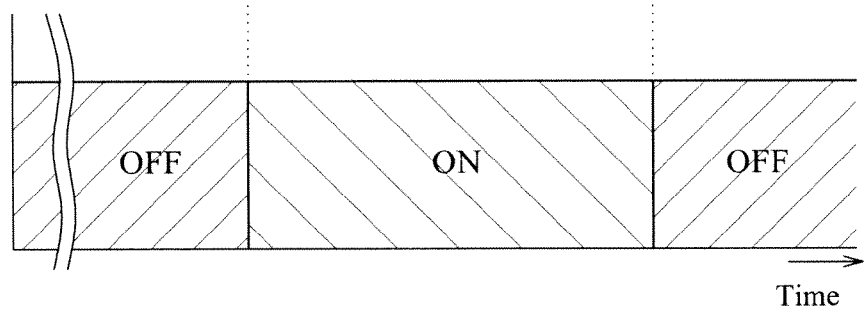

To cope with this, the control section 70 sets up the current output to the circuit including the interlock switch 50 so that the current may flow intermittently through the circuit at the predetermined regular intervals. For example, the control section 70 sets up a state in which a pulse-like current flows for a short time (e.g., 0.1 sec), and in which the output of the pulse-like current is repeated at the predetermined regular intervals (e.g., the regular intervals of 1 sec). Furthermore, the control section 70 monitors and determines whether the pulse-like current flows through the circuit including the interlock switch 50, and both the monitor and the determination are carried out in accordance with a timing at which the pulse-like current should be output (see: FIG. 5).

As stated above, the ON-state of the interlock switch 50. i.e., the state, in which the interlock switch 50 is closed, so that the current intermittently flows therethrough, is intermittently monitored by the control section 70. And it is determined by the control section 70 that the interlock switch 50 is ON while it is recognized that the state, in which the current intermittently flows through the interlock switch, is continued. Thus, the control is carried out by the control section 70 so that the electric power may be fed from the battery 80 to the resolver 60, and it is possible to shorten the total time of which the current actually flows through the interlock switch 50. Accordingly, it is possible to suppress the power consumption in the circuit including the interlock switch 50, and the real monitoring time can be shortened so that a load to be processed in the control section 70 can be reduced, whereby the power consumption can be made small. As a result, a useless consumption of the electric power of the battery 80 can be suppressed, so that duration time of the battery 80 can be further prolonged.

Third Embodiment of the Invention

Also, in the actuator according to the aforesaid first embodiment, although the power supply from the batter 80 to the resolver 60 is carried out without a specific regulation in the state in which the input shaft 11 of the reduction mechanism 10 and the manual inputting means 30 are linked to each other during the power failure, the present invention is not limited to this. According to the third embodiment, in a case where the electric power is fed from the battery 80 to the resolver 60 during the power failure, a control is carried out by the control section 70 so that an electrical current intermittently flows into the resolver 60 plural times at time intervals whenever the electric motor output shaft 21 makes one revolution.

Figure 6:
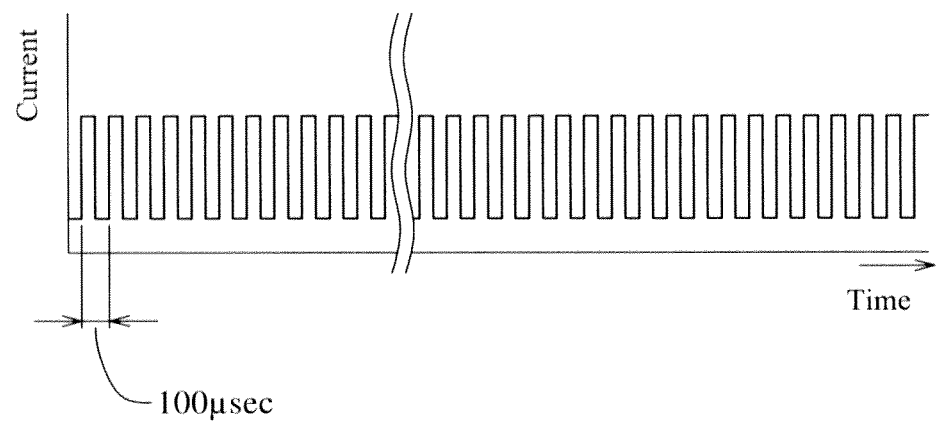
FIG. 6 is an explanatory view showing a current-flowing state of a resolver of an actuator according to a third embodiment of the present invention.
Figure 6:
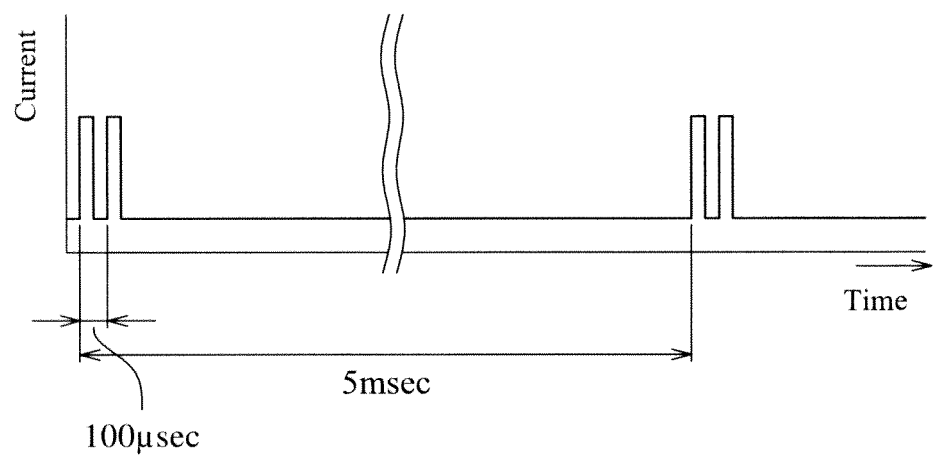

The control section 70 must make an exciting current flow into the resolver 60 for the specifications thereof, before it is possible to obtain an output signal from the resolver 60, but it is desirable to make the current flowing into the resolver 60 small when taking into account durability of the power supply from the battery 80. Thus, in the case where the electric power is fed from the battery 80 to the resolver 60 during the power failure, the exciting current intermittently flows into the resolver 60 plural times at time intervals whenever the electric motor output shaft 21 makes one revolution, no that a signal representing an angular position is output from the resolver 60 plural times when the electric motor output shaft 21 linked to the manual inputting means 30 makes one revolution. For example, when the exciting current is a pulse-like current, intermittently flows into the resolver extremely for a short time (e.g., about 100 μsec) corresponding to one or several pulse-like currents at predetermined time intervals (e.g., 0.005 sec) (see: FIG. 6).

While the electric motor output shaft 21 is manually and slowly rotated, whenever the output shaft makes one revolution, the signal is output from the resolver 60 plural times in correspondence to the fact that the pulse-like current intermittently flows into the resolver 60. While this state is continuously maintained during the rotation of the output shaft 21, the control section 70 can count a number of revolutions of the output shaft 21 without any problems based on the signals representing angular positions, so that it is possible to obtain a ratio of valve opening of the valve 90. Thus, while maintaining the state in which the ratio of valve opening of the valve 90 can be suitably obtained based on the signals output from the resolver 60, it is possible to shorten the total time of which the current actually flows through the resolver 60 during the power failure, so that the power consumption in a circuit including the resolver 60 can be reduced. As a result, a useless consumption of the electric power of the battery 80 can be suppressed, so that duration time of the battery 80 can be further prolonged.

Fourth Embodiment of the Invention

Figure 7:
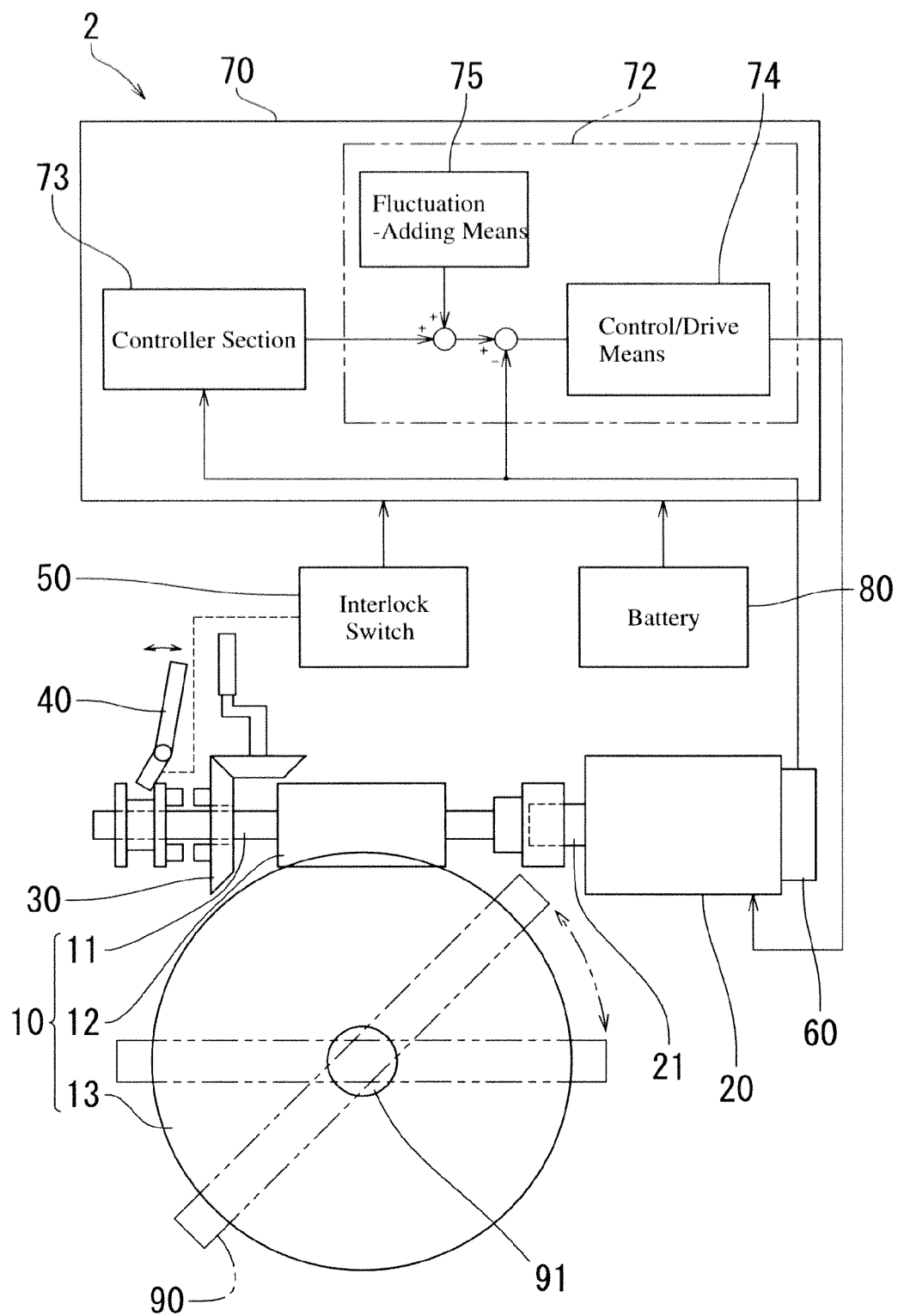
FIG. 7 is a schematic view for explaining an actuator according to a fourth embodiment of the present invention.
Figure 8:
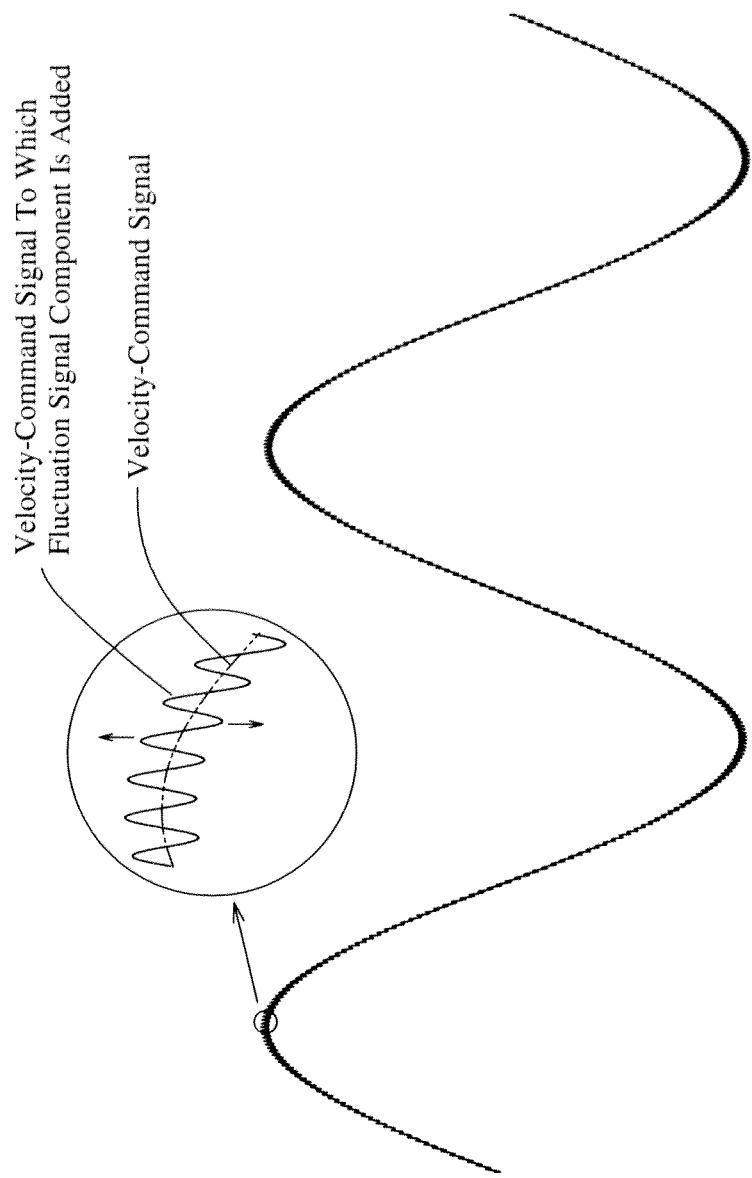
FIG. 8 is an explanatory view showing a time-changing wave of a velocity-command signal in a control section of the actuator according to the fourth embodiment of the present invention.

With reference to FIGS. 7 and 8, an actuator according to a fourth embodiment of the present invention will now be explained below.

In these drawings, similar to the aforesaid first embodiment, the actuator 2 according to the fourth embodiment of the present invention includes a reduction mechanism 10, an electric motor 20, a manual inputting means 30, a switching means 40, an interlock switch 50, a resolver 60, a control section 70 and a battery 80, but it is different from the first embodiment in that a control is carried out by the control section 70 so that an angular velocity of the output shaft 21 of the electric motor 20 is increased and decreased within a predetermined range with respect to a target velocity, which is set based on a velocity command concerning an operation of the valve 90, in a usual power supply state, and so that the increasing and decreasing fluctuation is repeated.

The aforesaid control section 70 includes a drive control section 72 for controlling the electric motor 20 in the usual power supply state in accordance with an output signal from the resolver 60, and a controller section 73 for outputting a velocity-command signal to the drive control section 72 in the usual power supply state when receiving an operational command from an external controller, with the velocity-command signal representing that the valve 90 is opened at a predetermined ratio of valve opening.

By the aforesaid drive control section 72, not only a servo-control of the electric motor 20 is carried out in the usual power supply state in accordance with the signal output from the resolver 60, but also the angular velocity of the output shaft 21 of the electric motor 20 is increased and decreased within the predetermined range with respect to the target velocity which is set based on the velocity command concerning the operation of the valve 90, and the control is carried out so that the increasing and decreasing fluctuation is repeated.

Concretely, in the servo-control of the electric motor 20 defined as the servo-motor, a control/drive means 74 feeds an electrical current to the electric motor while carrying out a velocity control, a filter control, a current control and so forth, and a fluctuation signal component, which is output from a fluctuation-adding means 75, and which has a predetermined high frequency and a continuous wave of fine amplitude (e.g., a sine wave), is added to the velocity-command signal output from the controller section 73 as the velocity command concerning the operation of the valve 90 defined as the object to be driven, at a location on a line between the controller section 90 and the control/drive means 74, where is upstream from a location at which a feedback of velocity information really detected by the resolver 60 is carried out, resulting in the increasing and decreasing fluctuation in the angular velocity of the electric motor output shaft 21.

With this control of the drive control section 72, while maintaining the rotation of the output shaft 21 of the electric motor 20 in the same rotational direction as that based on the velocity command, the increasing and decreasing fluctuation, in which the angular velocity of the output shaft 21 is slightly increased and decreased within the predetermined range with respect to the target velocity, is repeatedly caused at a very short cycle, i.e., the angular velocity is finely fluctuated. The fluctuation of the angular velocity may be regarded as a fine general-oscillation of the output shaft 21 in the rotational direction, and this fine general-oscillation state also occurs in the worm 12 which is integrally rotated together with the output shaft 21. Thus, similar to a case where an ordinary simple oscillation is exerted on both a worm and a worm wheel, a contact state between the gear faces of the worm 11 and the gear faces of the worm wheel 12 is improved, resulting in decrease in friction therebetween.

In this arrangement of the worm 12 and the output shaft 21 of the electric motor 20, when the state, in which the real angular velocity is increased and decreased with respect to the target velocity based on the velocity command, is put in other words, using a number of revolution which can be easily measured, it is possible to say that both the output shaft 21 and the worm 12 are rotated at an increasing and decreasing rotational difference with respect to the target number of revolution based on the velocity command.

An amplitude of the fluctuation signal component, which is added to the velocity-command signal in the drive control section 72, is defined as a range of the number of revolution in which a rotational difference to the target number of revolution really caused in the revolution of the output shaft 21 is included, i.e., an increasing and decreasing fluctuation range of the angular velocity of the output shaft 21 (i.e., an amplitude of an increasing and decreasing fluctuation wave). Also, a frequency of the fluctuation signal component is defined as a frequency of the increasing and decreasing fluctuation in the angular velocity of the output shaft 21.

In the drive control section 72, a relationship between the amplitude of the fluctuation signal component to be added to the velocity-command signal and the maximum rotational difference to the target number of revolution really caused in the revolution of the output shaft 21 as well as a relationship between the frequency of the fluctuation signal component and the frequency of the increasing and decreasing fluctuation in the real angular velocity of the output shaft 21 are previously prepared and determined, and the fluctuation signal component which is set as a suitable amplitude and frequency wave is added to the velocity command current by the fluctuation-adding means 75 so that an increasing and decreasing fluctuation of the angular velocity corresponding to a desirable oscillation state is caused in both the real output shaft 21 and the worm 12.

For example, when the target number of revolution of the electric motor 20 (i.e., the rated number of revolution) is 3,000 rpm, it is preferable that the frequency of the increasing and decreasing fluctuation of the angular velocity of the output shaft 21 falls within a range from 1 to 10 kHz, and that the maximum rotational difference (i.e., the offset number of revolution) to the target number of revolution is 250 rpm. In short, in the drive control section 72, the fluctuation signal component having a predetermined amplitude and a predetermined frequency which are previously confirmed so that the aforesaid control can be obtained is added to the velocity-command signal. After the addition, the velocity-command signal is defined as a signal in which the original velocity-command signal overlaps with a sine-like fluctuation wave having a high frequency and a small amplitude. Especially, as shown in FIG. 8, when the electric motor is an AC servo-motor, the velocity-command signal having an alternating wave overlaps with a wave having the considerably higher frequency than that of the velocity-command signal and the considerably smaller amplitude than that of the velocity-command signal. Thus, while an oscillation based on the increasing and decreasing fluctuation of the angular velocity is given to the output shaft, no influence is exerted to the servo-control in which a number of revolution generally equal to the target number of revolution is maintained.

Note, in the servo-control of the electric motor 20 by the drive control section 72, since it is known that the rotational control of the electric motor 20 is carried out based on the velocity-command signal, using the feedback of the rotational velocity information of the electric motor output shaft 21 obtained from the output signal of the resolver 60, a further detailed explanation on the servo-control is omitted.

In the usual power supply state, the controller section 73 is subjected to an operational command for opening the valve 90 at a predetermined ratio of valve opening through the intermediary of an external manipulation, a cable communication using an electrical cable or an optical cable by a command control means or a wireless communication, and gains positional information on a valve-opening position from the output signal of the resolver 60 to carry out a positional control, thereby outputting the velocity-command signal to the drive control section 72.

In the operation of the electric motor 20 carried out by the controller section 73 and the drive control section 72, since a basic sequential control, in which the electric motor 20 is stopped after the valve 90 is opened and closed to move it to a predetermined ratio of valve opening, is a servo-control concerning a known valve opening and closing regulation, a further detailed explanation is omitted.

Next, an operation of the aforesaid actuator in the usual power supply state will be explained. On the condition that a command signal for opening or closing the valve 90 is input from an outside to the controller section 73 of the control section 70 so that a velocity-command signal is fed from the controller section 73 to the drive control section 72, the electric motor 20 is initially driven by the drive control section 72 so as to be rotated, and thus a rotational driving force is transmitted to the support shaft 91 of the valve 90 through the intermediary of the reduction mechanism 10.

When the electric motor 20 is rotationally driven, the drive control section 72 not only carries out a servo-control together with the controller section 73, based on a signal output from the resolver 60, but also adds a fluctuation signal component, having a wave featured with a predetermined suitable amplitude and a predetermined frequency, to the velocity-command signal transmitted to the electric motor 20 for operating the valve 90.

In the control based on the command signal after the addition is performed, while the output shaft 21 of the electric motor 20 is rotated in the rotational direction based on the velocity-command signal, the angular velocity of the output shaft 21 is increased and decreased with respect to the target velocity within the range which is determined by the amplitude of the fluctuation signal component, and the increasing and decreasing fluctuation is repeated at a frequency which is determined by the frequency of the fluctuation signal component. Note, when the increasing and decreasing fluctuation of the angular velocity of the output shaft 21 is put in other words, using a number of revolution thereof, it is possible to say that the real number of revolution of the output shaft 21 is increased and decreased with respect to the target number of revolution within a range of rotational difference which is determined by the amplitude of the fluctuation signal component.

The state in which the increasing and decreasing fluctuation of the angular velocity is caused in the output shaft 21, i.e., the state in which the angular velocity is finely fluctuated between a high speed side and a low speed side may be regarded as a fine general-oscillation of the output shaft 21 in the rotational direction, and this fine general-oscillation of the output shaft 21 also occurs in the worm 12 mounted on the input shaft 11 integrally connected to the output shaft 21. Thus, similar to a case where an ordinary simple oscillation is added to both a worm and a worm wheel, in the reduction mechanism 10, friction between the gear faces of the worm 12 and the gear faces of the worm wheel 13 is decreased, resulting in improvement of an efficiency of force transmission. Also, due to the general oscillation of both the output shaft 21 and the worm 12 in the rotational thereof, bearings for the output shaft 21 and worm 12 are hard to be subjected to unnecessary force in thrust and radial directions, to thereby suppress bad influence to be exerted thereon.

With the improvement of the force transmission efficiency of the reduction mechanism 10, in comparison with a case where the same electric motor and the same reduction mechanism are used, but the general-oscillation state is not caused in a similar manner to a conventional servo-control, it is possible to further increase an output of the actuator to thereby drive the valve 90. Also, similar to the aforesaid first embodiment, when the valve 90 is moved to a position corresponding to a predetermined ratio of valve opening, the electric motor 20 is stopped, resulting in completion of the opening and closing operation.

Note, since an operation of the actuator according to this embodiment in the power failure state is similar to that of the above-mentioned first embodiment, an explanation thereon is omitted.

As stated above, in the actuator according to this embodiment of the present invention, the electric motor 20 is controlled by the drive control section 72 of the control section 70 so that the output shaft 11 is rotated at the target angular velocity determined in accordance with a state of the valve 90 and based on a velocity command concerning the operation of the valve 90. Also, by the drive control section 72, the angular velocity of the electric motor output shaft 21 is increased and decreased within the predetermined range with respect to the target velocity based on the velocity command concerning the operation of the valve 90, and the control is carried out so that the increasing and decreasing fluctuation is repeated. Thus, while the worm 12, which is directly connected to the electric motor output shaft 21, is rotated, the fine fluctuation is exerted on the angular velocity of the worm 12 so that the worm 12 is rotated in the state which may be regarded as the fine oscillation in the rotational direction thereof. As a result, due to the generation of the fine general-oscillation, the contact state between the gear faces of the worm 12 and the gear faces of the worm wheel 13 is improved so that friction in the slide contact therebetween is decreased, to thereby result in progress in the force transmission efficiency of the worm gear mechanism. Thus, it is possible to further increase the driving force and the torque which are transmitted to the valve by the actuator, in comparison with a conventional actuator in which an equivalent electric motor and an equivalent reduction mechanism are used. Accordingly, if the electric motor and the reduction mechanism are miniaturized, it is possible to use them in a situation in which a large-sized actuator having a high rated performance is needed, because the real driving force and the torque can be increased. Further, it is possible to miniaturize the whole of the actuator without deterioration of the performance.

Fifth Embodiment of the Invention

In the actuator according to the above-mentioned fourth embodiment, while the electric motor 20 is rotationally driven based on the command concerning the operation of the valve 90 in the usual power supply state, the angular velocity of the output shaft 21 of the electric motor 20 is controlled by the drive control section 72 so as to be always subjected to the increasing and decreasing fluctuation, so that the general-oscillation state occurs in the output shaft 21 and worm 12 in the rotational direction thereof. However, the present invention is not limited to the fourth embodiment. In the fifth embodiment of the present invention, the control in which the output shaft 21 of the electric motor 20 is subjected to the increasing and decreasing fluctuation by the drive control section 72 and the control in which the angular velocity of the output shaft 21 is maintained at the target velocity based on the velocity command without being subjected to the increasing and decreasing fluctuation may be switched to each other in accordance with a degree of the ratio of valve opening.

In a valve, it is known that it is necessary to operate the valve with a larger torque value than a rated torque value needed at a middle ratio of valve opening, which may be defined as an initiating torque value which is needed when the valve is opened from a closed state or as a shutting torque value which is needed when the valve is completely closed from a small opening state just before it is shut. In accordance with this characteristic, the angular velocity of the output shaft 21 of the electric motor 20 is controlled by the drive control section 72 so as to be subjected to the increasing and decreasing fluctuation only when the valve 90 is initially opened from the closed state or only when the valve 90 is completely closed from the small opening state just before it is shut. In the opening operation and the closing operation of the valve 90 except for these cases, the drive control section 72 switches to the control in which the angular velocity of the output shaft 21 is maintained at the target velocity based on the velocity command.

In a case where the electric motor 20 is driven to thereby open and close the valve 90 in the usual power supply state, a signal corresponding to a rotational displacement of the electric motor 20 is output from the resolver 60, and a ratio of valve opening of the valve 90 can be calculated based on the output signal so that it is possible to monitor the ration of valve opening. Thus, for example, during the closing operation of the valve 90, when the valve 90 reaches the ratio of valve opening at which it must be operated at the large torque value such as the shutting torque value, the drive control section 72 switches from the control state in which the angular velocity of the output shaft 21 is the target velocity to the control state in which the angular velocity of the output shaft 21 is subjected to the increasing and decreasing fluctuation. In contrast, during the initially-opening operation of the valve 90, when the state in which the large torque value such as the initially-opening torque value is needed is shifted to the state in which the valve can be operated at a torque value which is equal to or more than the rated torque value, the drive control section 72 switches from the control state in which the angular velocity of the output shaft 21 is subjected to the increasing and decreasing fluctuation to the control state in which the angular velocity of the output shaft 21 is the target velocity.

As stated above, in the initially-opening state or the finally-shutting state in which the torque value is needed most of all in the operation of the valve 90, the control is carried out by the drive control section 72 so that the angular velocity of the output shaft 21 of the electric motor 20 is subjected to the increasing and decreasing fluctuation, and so that the worm 12 is rotated in the general-oscillation state in the rotational direction. Thus, it is possible to reduce the friction in the reduction mechanism 10 to thereby improve the efficiency of force transmission so that the sufficient torque value is generated whereby the valve 90 can be operated without any troubles. On the other hand, in an intermediate loading state in which a large torque value is not needed, it is possible to drive the electric motor 20 so that the rated torque value can be obtained. Thus, although the electric motor and the worm gear mechanism are selected based on a standard for obtaining a necessary rated torque value, it is possible to output the maximum torque value, if necessary. That is, it is possible to use a small-sized electric motor and so forth in which an output force is suppressed in a rated operation in which the worm is not driven in general-oscillation state, so that a production cost of the actuator can be reduced, and so that it is possible to entirely and compactly constitute the actuator.

Also in this embodiment, although the control is carried out so that the angular velocity of the output shaft of the electric motor is subjected to the increasing and decreasing fluctuation at both the time when the valve is initially opened from the closed state and the time when the valve is completely closed from the small opening state just before it is shut, it is possible to carry out the control so that the angular velocity of the output shaft of the electric motor is subjected to the increasing and decreasing fluctuation only either the time when the valve is initially opened from the closed state or the time when the valve is completely closed from the small opening state just before it is shut.

Further, in the actuator according to each of the aforesaid embodiments, although the driving force is transmitted from the electric motor 20 to the support shaft 91 of the valve 90 through the intermediary of the reduction mechanism 10 to thereby open and close the valve 90, the present invention may be applied to a gate opening/closing mechanism for another valve in which a plate-like gate is moved upward and downward or laterally to thereby open and close a fluid passage. Further, when the valve or the gate is supported by not the support shaft but a support member such as a chain, a wire or the like, of course, it is possible to use suitable intermediate elements to transmit the driving force between the worm wheel and the support member such as the chain, the wire or the like.

Further, in the actuator according to each of the aforesaid embodiments, although the reduction mechanism 10 for transmitting the driving force to the support shaft 91 of the valve 90 defined as the object to be driven is formed as the worm gear reduction mechanism, the present invention is not limited to this. For example, in order that an accidental movement of the object to be driven, such as a valve, a gate or the like, is prevented when an external force resulted from a flowing fluid, the force of gravity or the like is exerted on the valve, the gate or the like, it is possible to utilize another reduction mechanism which features a self-lock property for preventing an input side of the reduction mechanism from being moved when a force is exerted on au output side thereof.

Also, in the actuator according to each of the aforesaid embodiments, although the resolver 60 is integrally attached to the electric motor 20 so that the input shaft 11 of the reduction mechanism 10 is rotated either when the electric motor 20 is driven or when the manual operation is carried out, although the signal is output from the resolver 60 in accordance with the rotation of the electric motor output shaft 21 integrally connected to the input shaft 11 when the valve 90 defined as the object to be driven is operated by the driving force transmitted through the reduction mechanism 10, and although the ratio of valve opening of the valve 90 is calculated and obtained based on the signal output from the resolver, the present invention is not limited to this arrangement. The resolver may be attached to the output shaft of the reduction mechanism, e.g., the shaft of the worm wheel in each of the aforesaid embodiments, so that the signal is output from the resolver in accordance with the rotation of the output shaft of the reduction mechanism. Since a number of revolutions of the output shaft of the reduction mechanism is smaller than that of the electric motor output shaft, a frequency of an exciting current flowing into the resolver becomes smaller so that it is possible to considerably reduce the electric power consumed in the resolver. Thus, the power consumption of the battery can be further suppressed so that it is possible to further prolong duration time of the battery.

Also, in the actuator according to each of the aforesaid embodiments, although the manual handle 33 used for the person's manual operation during the power failure is integrally connected to a central shaft of the manual gear 34 so as to be in the outside of the actuator casing 1a, the manual handle 33 may be detachable to the central shaft of the manual gear 34 so as to be able to be connected thereto only when the objected to be driven, such as the valve and so forth, is manually operated during the power failure. In this case, the shaft of the manual gear to which the manual handle should be connected may be a general-purpose type. Thus, in addition to the manual handle, a mobile electrical tool by which a rotational driving force is produced with a storage battery or an electrical generator or a portable automatic tool by which is a rotational driving force is produced using a pneumatic force or a hydraulic force may be connected to the shaft of the manual gear, so that labor can be considerably saved by utilizing the rotational driving force of the mobile electrical tool and so forth.

As stated above, in the case where the manual handle is detachable and is connected to the shaft of the manual gear, if necessary, it is preferable to prevent the connection of the manual handle to the shaft of the manual gear until the interlock switch is turned ON. For example, the switching means, which is manually shifted so that the interlock switch is turned ON and OFF, has an obstacle portion which is placed at a location where the manual handle is connected to the shaft of the manual gear, so that the connection of the manual handle to the shaft of the manual gear is obstructed until the switching means is moved to the position at which the interlock switch is turned ON. Thus, if the switching means is shifted the automatic position to the manual position in the state in which the electric motor is not stopped, it is impossible to connect the manual handle to the shaft of the manual gear for the manual operation until the interlock switch is turned ON. Accordingly, it is possible to avoid a dangerous situation caused by an accidental rotation of the manual handle in the state in which the shaft of the manual gear, to which the manual handle should be connected, can be rotated while the electric motor is not stopped, thereby ensuring safety.

Also, reversely, although it is tried that the switching means is shifted from the manual position to the automatic position in the state in which the manual handle is connected to the shaft of the manual gear, the shift of the switching means from the position at which the interlock switch is in the ON-state is prevented due to the fact that the manual handle obstructs the shift of the switching means. Thus, it is forced that the interlock switch is turned OFF after the manual handle is disconnected from the shaft of the manual gear. Accordingly, even if the usual power supply state is restored from the power failure state at the time when the switching means is shifted from the manual position to the automatic position, the electric motor can be driven by the interlock switch in the state in which the manual handle is not lined to the electric motor side due to the disconnection of the manual handle from the shaft of the manual gear. Thus, although the electric motor is driven with the supply of the electric power, no influence is exerted on another part except for the actuator itself, thereby ensuring safety.

REFERENCE SIGNS LIST 1,2 Actuator
1a Actuator Casing
10 Reduction Mechanism
11 Input Shaft
12 Worm
13 Worm Wheel
14 Joint Portion
15 Clutch Body
16 Driven-Side Coupling Portion
17 Groove Portion
20 Electric Motor
21 Output Shaft
30 Manual Inputting Means
31 Drive-Side Coupling Portion
32 Gear Portion
33 Manual Handle
34 Manual Gear
40 Switching Means
41 Cam Portion
42 Rod Portion
50 Interlock Switch
60 Resolver
70 Control Section
71 Displaying Portion
72 Drive Control Section 73 Controller Section
74 Control/Drive Means
75 Fluctuation-Adding means
80 Battery
90 Valve
91 Support Shaft

The invention claimed is:

1. A position-detecting method for an actuator in which a rotational driving force, generated in an electric motor, is transmitted to an object to be driven, through the intermediary of a reduction mechanism, characterized by:
   feeding an electric power from a battery to minimum necessary circuits of a control section during a power failure;
   further feeding an electric power from said battery to a resolver for detecting a rotating state of an output shaft of said electric motor during the power failure, when said control section detects an ON-state of an interlock switch which represents that an input shaft of said reduction mechanism is linked to a manual inputting means rotationally driven by a person's driving operation, so as to be rotated; and
   obtaining a displacement of the object to be driven based on a signal which is output from said resolver, and which is related to the rotating state of the output shaft of said electric motor resulting from the person's driving operation.

2. A position-detecting method for an actuator in which a rotational driving force, generated in an electric motor, is transmitted to an object to be driven, through the intermediary of a reduction mechanism, characterized by:
   feeding an electric power from a battery to minimum necessary circuits of a control section during a power failure;
   further feeding an electric power from said battery to a resolver for detecting a rotating state of an output shaft of said reduction mechanism during the power failure, when said control section detects an ON-state of an interlock switch which represents that an input shaft of said reduction mechanism is linked to a manual inputting means rotationally driven by a person's driving operation, so as to be rotated; and
   obtaining a displacement of the object to be driven based on a signal which is output from said resolver, and which is related to the rotating state of the output shaft of said reduction mechanism resulting from the person's driving operation.

3. An actuator for driving an object to be driven by transmitting a rotational driving force, generated in an electric motor, to the object to be driven, through the intermediary of a reduction mechanism, characterized by:
   a manual inputting means that is rotated by a person's manual operation, and that is provided beside an input shaft defined as an input terminal of said reduction mechanism to which the rotational driving force is input;
   a switching means that switches a linking state in which the input shaft of said reduction mechanism is linked to said manual inputting means so as to be rotated and an unlinking state in which the input shaft of said reduction mechanism is not linked to said manual inputting means to each other;
   a detecting means that detects the linking state between the input shaft of said reduction mechanism and said manual inputting means;
   a rotation detector that detects a rotational state of an output shaft of said electric motor so as to output it as a signal;
   a control section that controls said electric motor, and that obtains a displacement of the object to be driven, based on a signal output from said rotation detector; and
   a battery that at least feeds an electric power to said control section in a power failure which is not a usual power supply state,
   wherein the input shaft of said reduction mechanism is directly connected to the output shaft of said electric motor to be integrally rotatable together therewith so that the rotational driving force generated in said electric motor is input to the input shaft of said reduction mechanism in the usual power supply state, and
   wherein said control section establishes a state in which the electric power is fed from said battery to only minimum necessary control circuits of said control in the power failure state, and a state in which the electric power is fed from said battery to said rotation detector so as to be able to obtain the displacement of the object to be driven, based on the signal output from said rotation detector.

4. The actuator as set forth in claim 3, further characterized by
   a clutch body that is provided on the input shaft of said reduction mechanism so as to be axially slidable and be integrally rotatable together therewith, and that includes a driven-side coupling portion provided at one end portion thereof in a sliding direction,
   wherein said manual inputting means has a drive-side coupling portion which is rotatably provided beside the end portion of said clutch body so that a rotational axis of the drive-side coupling portion coincides with that of the input shaft of said reduction mechanism, and which is able to be coupled to the driven-side coupling portion of said clutch body,
   wherein said switching means is provided so that at least a portion thereof is engaged with said clutch body such that an axial position of said clutch body is adjustable with respect to the input shaft of said reduction mechanism, with said clutch body being shifted by said switching means so that a connecting-state between said clutch body and said manual inputting means and a disconnecting-state therebetween are switched to each other, to thereby switch a linking state between the input shaft of said reduction mechanism and said manual inputting means and an unlinking state therebetween to each other, and
   wherein said detecting means comprises an interlock switch which is contacted with a portion of said switching means in accordance with a movement of said clutch body to establish the connecting-state between said clutch body and said manual inputting means by said switching means, to thereby turn ON said interlock switch.

5. The actuator as set forth in claim 4, characterized by the fact that
   said control section, to which the electric power is fed from said battery in the power failure state, establishes a current-outputting state in which an electric current intermittently flows into a circuit including said interlock switch at predetermined time intervals when said circuit is closed interlock switch, and determines that said interlock switch is in the ON-state while the current-outputting state in which the electric current is intermittently flows is continued.

6. The actuator as set forth in claim 3, characterized by the fact that
   said rotation detector comprises a resolver integrally provided on said electric motor.

7. The actuator as set forth in claim 6, characterized by the fact that
said control section establishes a state in which an electrical current intermittently flows into said resolver at least plural times at time intervals whenever said electric motor output shaft makes one revolution, upon detecting the linking state between the input shaft of said reduction mechanism and said manual inputting means by said detecting means so that the electric power is fed from said battery to said resolver.

8. The actuator as set forth in claim 3, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

9. The actuator as set forth in claim 4, characterized by the fact that
said rotation detector comprises a resolver integrally provided on said electric motor.

10. The actuator as set forth in claim 5, characterized by the fact that
said rotation detector comprises a resolver integrally provided on said electric motor.

11. The actuator as set forth in claim 9, characterized by the fact that
said control section establishes a state in which an electrical current intermittently flows into said resolver at least plural times at time intervals whenever said electric motor output shaft makes one revolution, upon detecting the linking state between the input shaft of said reduction mechanism and said manual inputting means by said detecting means so that the electric power is fed from said battery to said resolver.

12. The actuator as set forth in claim 10, characterized by the fact that
said control section establishes a state in which an electrical current intermittently flows into said resolver at least plural times at time intervals whenever said electric motor output shaft makes one revolution, upon detecting the linking state between the input shaft of said reduction mechanism and said manual inputting means by said detecting means so that the electric power is fed from said battery to said resolver.

13. The actuator as set forth in claim 4, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

14. The actuator as set forth in claim 5, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

15. The actuator as set forth in claim 6, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

16. The actuator as set forth in claim 7, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

17. The actuator as set forth in claim 9, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

18. The actuator as set forth in claim 10, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

19. The actuator as set forth in claim 11, characterized by the fact that
said reduction mechanism comprises a worm gear reduction mechanism, a worm of which is integrally mounted on the input shaft of said reduction mechanism,
wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

20. The actuator as set forth in claim 12, characterized by the fact that said reduction mechanism comprises a worm gear reduction mechanism, a worm of which is integrally mounted on the input shaft of said reduction mechanism, wherein said control section carries out a control so that an angular velocity of the output shaft of said electric motor is increased and decreased within a predetermined range with respect to a target velocity, which is set based on a velocity command concerning an operation of the object to be driven, in the usual power supply state, and so that the increasing and decreasing fluctuation is repeated.

21. The actuator as set forth in claim 3, characterized by the fact that said rotation detector comprises a resolver.

22. An actuator for driving an object to be driven by transmitting a rotational driving force, generated in an electric motor, to the object to be driven, through the intermediary of a reduction mechanism, characterized by:

a manual inputting means that is rotated by a person's manual operation, and that is provided beside an input shaft defined as an input terminal of said reduction mechanism to which the rotational driving force is input;

a switching means that switches a linking state in which the input shaft of said reduction mechanism is linked to said manual inputting means so as to be rotated and an unlinking state in which the input shaft of said reduction mechanism is not linked to said manual inputting means to each other;

a detecting means that detects the linking state between the input shaft of said reduction mechanism and said manual inputting means;

a rotation detector that detects a rotational state of an output shaft defined as an output terminal of said reduction mechanism from which the rotational driving force is output, to thereby output it as a signal;

a control section that controls said electric motor, and that obtains a displacement of the object to be driven, based on a signal output from said rotation detector; and a battery that at least feeds an electric power to said control section in a power failure which is not a usual power supply state, wherein the input shaft of said reduction mechanism is linked to the output shaft of said electric motor to be rotatable, and is rotated by the rotational driving force generated in said electric motor, and wherein said control section establishes a state in which the electric power is fed from said battery to only minimum necessary control circuits of said control in the power failure state, and a state in which the electric power is fed from said battery to said rotation detector so as to be able to obtain the displacement of the object to be driven, based on the signal output from said rotation detector.

23. The actuator as set forth in claim 22, characterized by the fact that said rotation detector comprises a resolver.

* * * * *